United States Patent
Chang et al.

(10) Patent No.: US 9,256,302 B2
(45) Date of Patent: Feb. 9, 2016

(54) STYLUS PEN

(71) Applicant: No Touch Technologies, LLC, Potomac, MD (US)

(72) Inventors: Christy Chang, Potomac, MD (US); Amy Pepper, Potomac, MD (US)

( * ) Notice: Subject to any disclaimer, the term of this patent is extended or adjusted under 35 U.S.C. 154(b) by 0 days.

(21) Appl. No.: 14/318,770

(22) Filed: Jun. 30, 2014

(65) Prior Publication Data

US 2015/0022503 A1  Jan. 22, 2015

Related U.S. Application Data

(60) Provisional application No. 61/856,855, filed on Jul. 22, 2013.

(51) Int. Cl.
*G06F 3/041* (2006.01)
*G06F 3/0354* (2013.01)
(Continued)

(52) U.S. Cl.
CPC ............ *G06F 3/03545* (2013.01); *B43K 29/00* (2013.01); *G06F 3/039* (2013.01); *G06F 3/044* (2013.01)

(58) Field of Classification Search
CPC ... G06F 3/033; G06F 3/03545; G06F 3/0386; G06F 3/041; G06F 3/042; G06F 3/044
USPC ........ D11/411; D19/115–186, 190–204, 904, D19/908, 918; 24/11 F, 11 P, 11 R; 401/52, 401/99, 192, 195, 196; 345/173–184; 178/18.01–20.04
See application file for complete search history.

(56) References Cited

U.S. PATENT DOCUMENTS 3,765,780 A    10/1973  Guu et al.
4,318,096 A    3/1982   Thornburg et al.
(Continued)

FOREIGN PATENT DOCUMENTS

| EP | 1264711 | 11/2002 |
|----|---------|---------|
| EP | 1319522 | 6/2003 |
| WO | WO2011008533 | 1/2011 |

OTHER PUBLICATIONS

ICLOOLY ICLOOLY Co Ltd; Stylus Elite for iPad, View stylus for iPad2, iClooly Product Details from ICLOOLY Co Ltd on Alibaba.com; Stylus Elite for iPad; Website; Apr. 10, 2013; Four Pages; http://iclooly.trustpass.alibaba.com/product/118271356-102957569/Stylus_Elite_for_iPad.html.
(Continued)

*Primary Examiner* — Kent Chang
*Assistant Examiner* — Nelson Rosario
(74) *Attorney, Agent, or Firm* — Werschulz Patent Law, LLC

(57) ABSTRACT

A stylus pen having a plurality of writing tips for writing on a plurality of dissimilar public surfaces, an ink tip configured for dispensing ink while writing on paper, a resistive stylus tip configured for writing on an electronic pad or use on a pin pad and a capacitive stylus tip for writing on a touch screen, all three tips in one stylus pen, for use by an individual, replacing a public pen, a public resistive stylus and eliminating touching a public touch screen with a finger. In one embodiment, each tip has an overcap with an antimicrobial sponge disposed therein, the sponge sanitizing the writing tip when not in use. Stylus pen housing is composed from antimicrobial material such as copper that is sanitary when the stylus pen is in use. An LED (light-emitting diode) light emitting UV light is provided on one overcap.

2 Claims, 4 Drawing Sheets

(51) Int. Cl.
    *G06F 3/044*         (2006.01)
    *B43K 29/00*        (2006.01)
    *G06F 3/039*         (2013.01)

(56) References Cited

U.S. PATENT DOCUMENTS

| | | | |
|---|---|---|---|
| 5,564,850 | A | 10/1996 | Nagaoka |
| 5,688,062 | A | 11/1997 | Shih |
| 5,713,680 | A | 2/1998 | Yoshino et al. |
| 5,882,667 | A * | 3/1999 | Jones ............................ 424/405 |
| 5,957,601 | A | 9/1999 | Weiss |
| 6,227,743 | B1 | 5/2001 | Robb |
| D453,354 | S | 2/2002 | Ikenaga et al. |
| 6,361,232 | B1 | 3/2002 | Nagaoka et al. |
| 6,412,998 | B1 | 7/2002 | Ham |
| D462,356 | S | 9/2002 | Ono et al. |
| 6,450,721 | B1 | 9/2002 | D'Amico et al. |
| 6,533,483 | B2 | 3/2003 | Carroll et al. |
| 6,688,792 | B1 | 2/2004 | Reichmann et al. |
| 6,749,354 | B2 | 6/2004 | Kageyama et al. |
| D497,179 | S | 10/2004 | Chen |
| D497,388 | S | 10/2004 | Kit |
| D501,505 | S | 2/2005 | Chien |
| D547,799 | S | 7/2007 | Granick |
| 7,683,895 | B2 | 3/2010 | Mika |
| D662,097 | S | 6/2012 | Lin |
| 8,231,587 | B2 * | 7/2012 | Solomon et al. .............. 604/265 |
| 2003/0132923 | A1 * | 7/2003 | Hu .................................. 345/179 |
| 2004/0024710 | A1 * | 2/2004 | Fernando et al. ............... 705/50 |
| 2006/0083579 | A1 | 4/2006 | Kageyama et al. |
| 2012/0086664 | A1 * | 4/2012 | Leto .............................. 345/174 |
| 2012/0194484 | A1 * | 8/2012 | Lehman ........................ 345/179 |
| 2013/0038579 | A1 | 2/2013 | Boyd et al. |
| 2013/0248098 | A1 * | 9/2013 | Taylor ............................ 156/247 |
| 2013/0249870 | A1 * | 9/2013 | Slaby et al. ................... 345/179 |
| 2013/0330115 | A1 * | 12/2013 | Steele et al. .................. 401/195 |
| 2015/0123932 | A1 * | 5/2015 | Collins .......................... 345/174 |

OTHER PUBLICATIONS

Hello Trade; Stylus Gentle Pen Writing Pen Manufacturer & Wholesale Supplier From South Korea—Iclooly Co., Ltd; Stylus Gentle Pen; Website; Apr. 10, 2013; Two Pages; http://www.hellotrade.com/iclooly/stylus-gentle-pen.html.

Copper International Copper Association Ltd./Copper Development Association; Copper-Brass-Bronze/Naturally Antimicrobial Alloys for Touch Surfaces; Website; May 2007; Four Pages; http://www.copperalliance.org.uk/.

* cited by examiner

STYLUS PEN

CROSS-REFERENCE TO RELATED APPLICATIONS

This application is a nonprovisional utility application of the provisional patent application, Ser. No. 61/856,855 filed in the United States Patent Office on Jul. 22, 2013 and claims the priority thereof and is expressly incorporated herein by reference in its entirety.

TECHNICAL FIELD

The present disclosure relates generally to a writing tool. More particularly, the present disclosure relates to an antimicrobial stylus pen that is a multiple tip writing tool for writing on public touch screens and electronic pads.

BACKGROUND

Merchants and service providers have embraced self-service technology that reduces the need for in-person attendants to conduct transactions. Paper receipts, paper money and coins are used less and less in transactions at stores, gas stations, video kiosks, banks, airlines, and trains as self-service becomes the norm for most customers.

Self-service has exploded in the past decade due to new transaction technologies, including touch screens and signature pads. While reducing human contact, these technologies do not reduce exposure to pathogens that cause sickness and disease, such as MRSA infections, pneumonia, influenza, the common cold, and other upper respiratory tract infections, norovirus, Campylobacter and other causes of gastroenteritis.

Public touch screens are part of everyone's world and so are these harmful germs left behind by the thousands of people that use them on a daily basis are rarely cleaned, especially not between each customer. Every signature pad has its own tethered stylus that is grasped by each customer without any routine cleaning. Many harmful germs linger on these inanimate public objects, many living for as long as 48 hours, some even as long as three weeks.

A customer who wishes to avoid exposure to germs found on touch screens and signature pads may want to wipe the public touch screen or stylus with a sanitizer, but generally sanitizers damage screens and cause the screens and pads to malfunction.

A customer can sanitize the hands after each encounter. However, many hand sanitizers have been proven not to be effective. Additionally, these sanitizers are alcohol-based and dry out the skin, causing the skin to crack and germs to enter, not just failing to protect against harmful germs, but increasing the risk of infection. Some contain the chemicals triclosan or triclocarban, not found in most waterways and many experts worry that over use and ubiquity of these chemicals will lead to the development of resistant germs.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a germ-free method of using public and shared use touch screens, while avoiding exposure to chemicals like triclosan and alcohol found in antimicrobial products. Accordingly, the present disclosure provides a combination stylus pen for use by an individual, the stylus pen having a capacitive tip, a resistive tip, and an ink pen allowing a user to avoid using a public resistive stylus and to avoid contacting a public use touch screen all together.

Another aspect of an example embodiment in the present disclosure is to provide a stylus pen that is convenient. Accordingly, the present disclosure provides a stylus pen that attaches to a keychain, cell phone, purse or lanyard, always conveniently accessible.

Still another aspect of an example embodiment in the present disclosure is to provide a sanitary way to write on a plurality of dissimilar surfaces found in public and to avoid contact with public and public use touch screens, including numeric keypads, signature pads, and public pens used for traditional signatures on keypads and touch screens found at an ATM, gas station, supermarket checkout, retail store checkout, video kiosk, airport terminal check-in kiosk, and train station ticket kiosk. Accordingly, an aspect of an example embodiment in the present disclosure provides a stylus pen having an ink tip configured for dispensing ink while writing on paper, a resistive stylus tip for configured for writing on an electronic pad or use on pin pads and a capacitive stylus for writing on a touch screen, all three tips in one stylus pen, for use by an individual, replacing a publicly used ink pen, replacing a public resistive stylus and eliminating touching a public touch screen with a finger, thereby avoiding exposure by eluding contact and decreasing the spread of germs.

A further aspect of an example embodiment in the present disclosure is to provide an overcap that sanitizes the writing trips. Accordingly, the present disclosure provides an antimicrobial sponge disposed in each overcap, the sponge sanitizing the writing tip when the overcap engages the tip when the tip is not in use.

Yet a further aspect of an example embodiment in the present disclosure is to provide a stylus pen that is sanitary. Accordingly, the present disclosure provides a housing for the stylus pen that is composed from antimicrobial material such as copper, brass or bronze that is sanitary when writing with the stylus pen and coating the housing with an antimicrobial coating.

Yet another aspect of an example embodiment in the present disclosure is to provide a stylus pen that lights up. Accordingly, the present disclosure provides an LED (light-emitting diode) light on one overcap, the LED providing ultraviolet (UV) light for killing bacteria.

The present disclosure describes a stylus pen having a plurality of writing tips for writing on a plurality of dissimilar public surfaces, an ink tip configured for dispensing ink while writing on paper, a resistive stylus tip for configured for writing on an electronic pad and a capacitive stylus tip for writing on a touch screen, all three tips in one stylus pen, for use by an individual in public, replacing a public ink pen, replacing a public resistive stylus and eliminating touching a public touch screen with a finger. Housing for the stylus pen is composed from antimicrobial material such as copper that is sanitary when the stylus pen is in use, the housing coated further with an antimicrobial coating. An LED (light-emitting diode) UV light is provided on one overcap.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

FIG. 2A is a partial view of the further example embodiment of the stylus pen showing a lighted end cap in detail.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
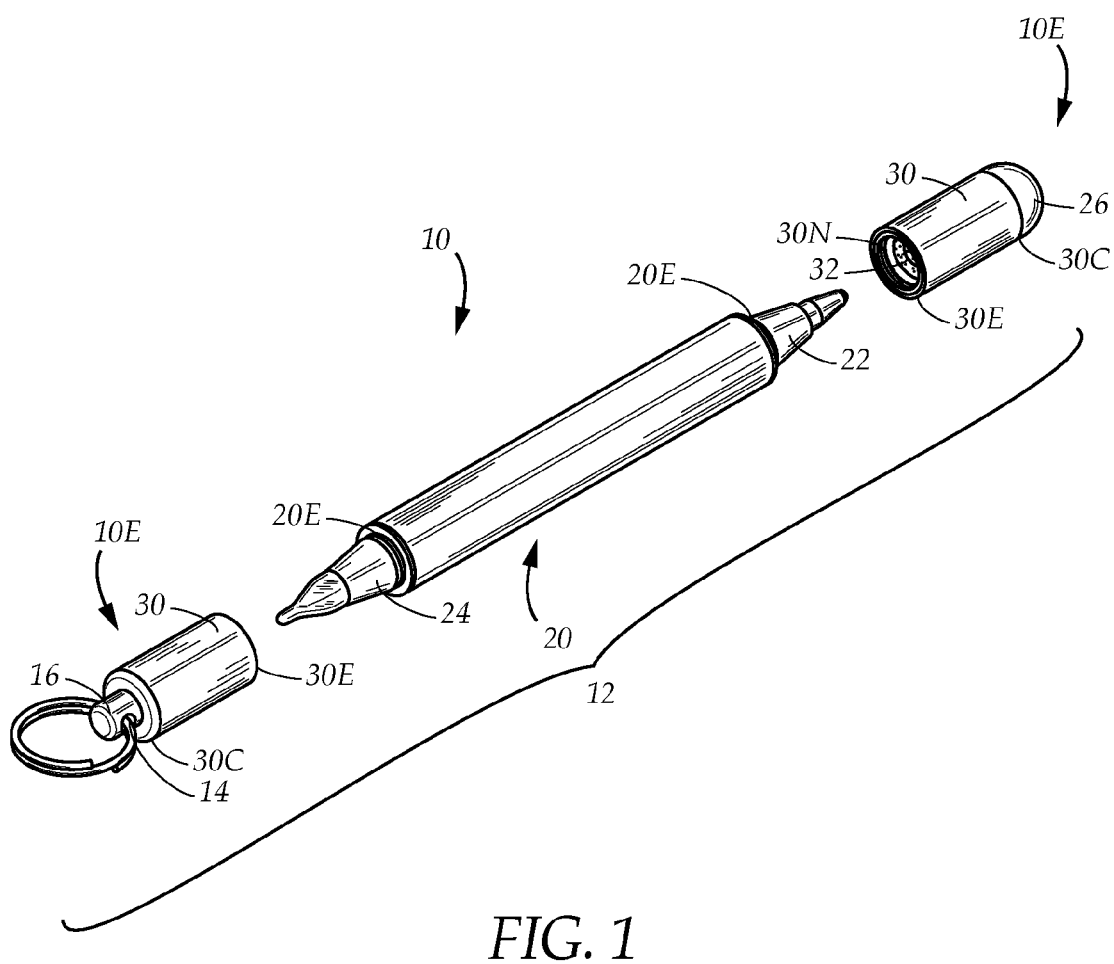
FIG. 1 is an exploded perspective view of an example embodiment of a stylus pen.

FIG. 1 illustrates a stylus pen 10 that provides a sanitary way to write on a plurality of dissimilar surfaces found in public and to avoid contact with public touch screens and publicly used styluses and pens.

The public styluses include those used with numeric keypads, signature pads, and as well as public ink pens used for traditional signatures on paper. Keypads, signature pads and touch screens can be found at an ATM, gas station, supermarket checkout, retail store checkout, video kiosk airport terminal check-in kiosk, and train station ticket kiosks.

An example embodiment in the present disclosure provides a stylus pen 10 having an ink tip 22 configured for dispensing ink while writing on paper, a resistive stylus tip 24 configured for writing on an electronic pad and a capacitive stylus tip 26 configured for writing on a touch screen, all three tips in one stylus pen, for use by an individual, replacing a publicly used ink pen, replacing a public resistive stylus and eliminating touching a touch screen or pin pad with a finger.

The stylus pen 10 has a housing 12 comprising a middle portion 20 having a pair of ends 20E with a writing tip on each end, a first end 20E having the ink tip 22 and a second opposing end 20E having a resistive stylus tip 24 configured for writing on an electronic pad. One of ordinary skill realizes that the order of the tips is immaterial.

The housing 12 further comprises a plurality of overcaps 30. Each middle portion end 20E has an overcap 30, the pair of overcaps configured for covering the ends 20E of the middle portion 20, each overcap 30 having a closed end 30C and an open end 30E, the open end configured for accessing said overcap interior 30N, each overcap open end 30E further configured for covering the ends 20E of the middle portion 20. A first overcap has a capacitive stylus tip 26 on said closed end, the capacitive stylus tip 26 configured for writing on a touch screen.

The stylus pen 10 has a pair of opposing ends 10E, the overcaps 30 forming the opposing end 10E of the stylus pen when in place over the writing tips on the ends 20E of the middle portion 20.

The housing 12 comprising the middle portion 20 and overcaps 30 is composed of an antimicrobial material selected from the group consisting of copper, brass and bronze. In one example embodiment, the copper is high purity with only trace amounts of heavy metals.

The housing 12 provides a sanitary surface for grasping when the stylus pen 10 is in use. The housing further comprises an antimicrobial coating. The antimicrobial coating has an antimicrobial undercoat and antimicrobial topcoat. In one example embodiment, the antimicrobial top coat is photocatalytic. In one example embodiment, the antimicrobial photocatalytic top coat contains zinc and titanium dioxide. In one example embodiment, the antimicrobial undercoat is a phenoxy phenol. In another example embodiment, the antimicrobial undercoat is polychloro phenoxyphenol (PCPP).

The housing 12 always provides a sanitary grasping surface because even as the coating wears away through use, the antimicrobial material of the housing remains.

A second overcap 30 has a protrusion 16 with a bore configured for attaching said overcap through said bore 14. In the illustration, a key ring is attached to the overcap through the bore to further attach the stylus pen to a wallet, purse or to be included with keys. It is understood by those of ordinary skill that the embodiment is not limited to attaching through a key ring, but many other attachment means are possible, such as a tether, a lanyard, a ribbon and a hook.

The middle portion 20 has a supply of ink therein for dispensing through the ink tip 22.

In another example embodiment, each overcap 30 has an antimicrobial sponge 32, the antimicrobial sponge disposed in each overcap interior 30N, the antimicrobial sponges contacting the writing tips on the ends of the middle portion 20 when said overcap engages said writing tips, said sponge sanitizing said writing tip when not in use.

Figure 2:
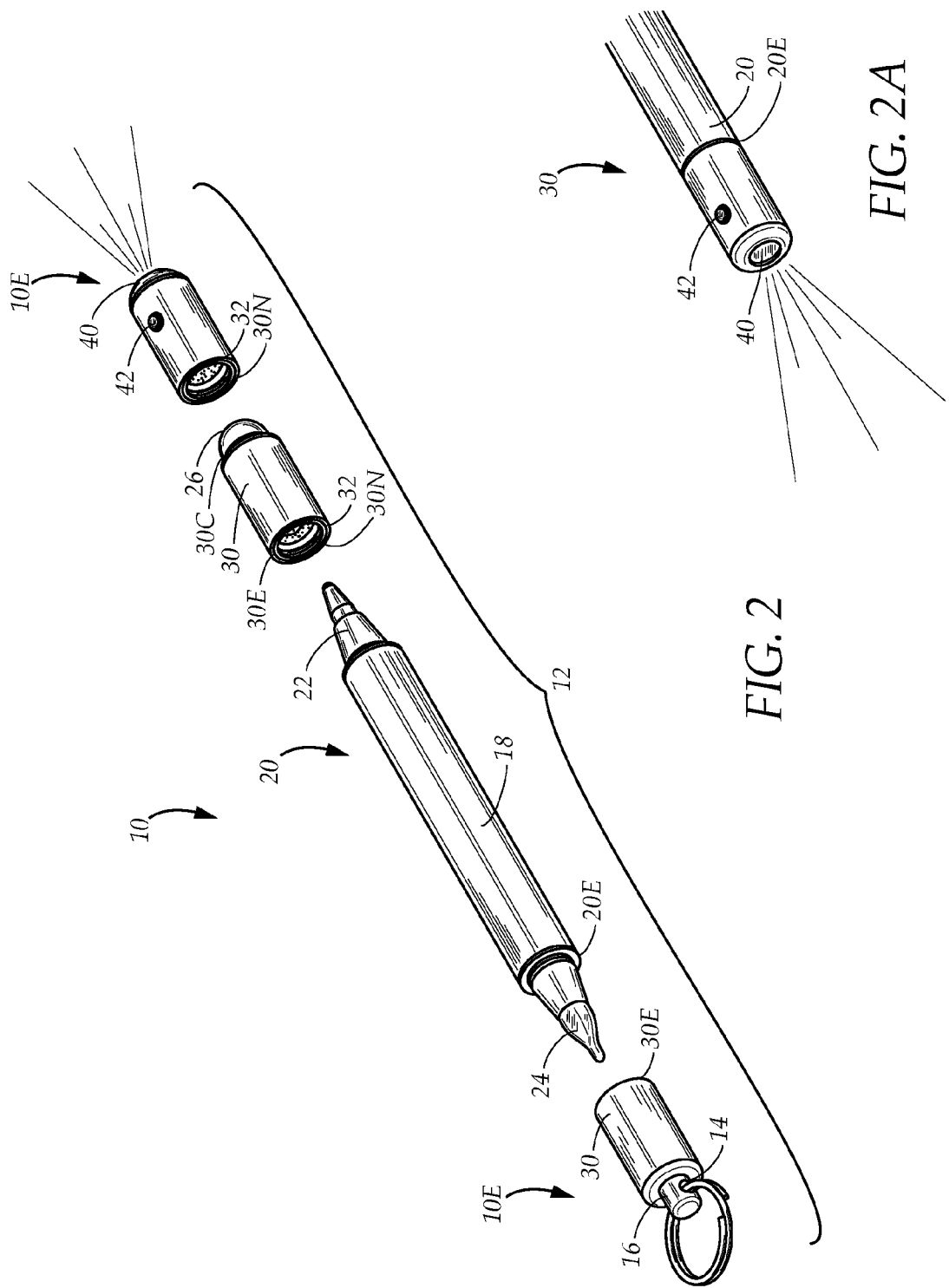
FIG. 2 is an exploded perspective view of a further example embodiment of the stylus pen.

FIG. 2 illustrates a further example embodiment of the stylus pen 10. In this example embodiment, the middle portion 20 has the pair of ends 20E with the writing tip on each end, the first end having ink tip 22 configured for dispensing ink while writing and the second end having the resistive stylus tip 26 configured for writing on the electronic pad. The capacitive stylus tip 26 is shown on the overcap 30 but it is understood that the capacitive stylus tip 26 can be on the overcap 30 or interchanged with the resistive stylus tip 24 on the middle portion 20.

In this example embodiment as shown, there are a plurality of overcaps 30 configured for covering the ends of the tips, each overcap having the closed end 30C and the open end 30E, the open end configured for accessing the cap interior 32, In the illustration, the first cap has the capacitive stylus tip 26 on said closed end 30C.

The housing 12 comprising the middle portion 20 and overcaps 30 is composed of an antimicrobial material selected and further comprises an antimicrobial coating as explained hereinabove.

The stylus pen has a pair of opposing ends 10E, and the second overcap has the protrusion 16 with the bore 14 configured for attaching said second overcap through said bore, said overcap disposed on the end 10E of the stylus pen.

A third overcap 30 has an LED (light-emitting diode) light 40 on the closed end, said third overcap disposed on the end of the stylus pen opposite the second overcap. The third overcap has a switch 42 for the LED light 40. In yet another example embodiment, the LED light 40 emits sanitizing ultraviolet light (UV), preferably UV-C light that has germ-killing abilities. The LED light is operative to sanitize a surface before a user engages the pen 10 to write.

As shown in FIG. 2A, the third overcap with the LED light 40 and switch 42 can be interchanged with the second overcap, coupling directly to the end 20E of the middle portion 20. It is understood that the overcaps can be disposed in different configurations, one overcap covering one writing tip, and various configurations are within the inventive concept.

In another example embodiment, a plurality of antimicrobial sponges 32 are disposed in each overcap interior, one sponge in each overcap. The antimicrobial sponges 32 contact the writing tips on the ends of the middle portion 20E and the writing tip on the closed end of the first overcap, when said overcaps 30 engage said writing tips, said sponges 32 sanitizing said writing tip when not in use.

Figure 3:
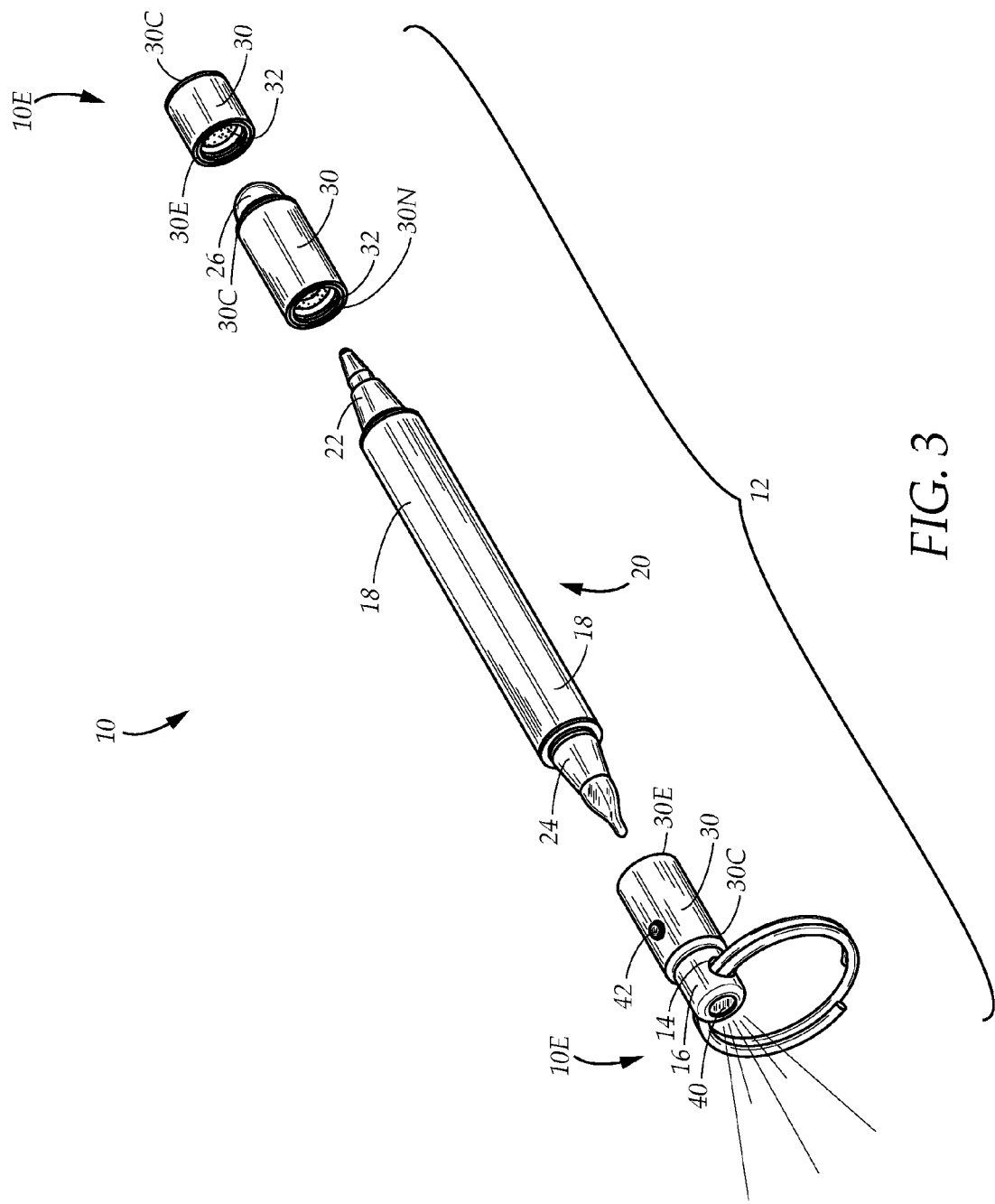
FIG. 3 is an exploded perspective view of another example embodiment of the stylus pen.

FIG. 3 shows a further example embodiment of the stylus pen. In this example embodiment, the second overcap 30 has the LED light 40 on the protrusion 16. In yet another example embodiment, the LED light 40 emits UV-C light.

The housing 12 comprising the middle portion 20 and overcaps 30 is composed of an antimicrobial material selected and further comprises an antimicrobial coating as explained hereinabove.

Referring to FIG. 1, in one example embodiment, the second overcap 30 having the LED light 40 on the protrusion 16 in FIG. 3 can be interchanged with the second overcap having only the protrusion. It is understood by those of ordinary skill that the overcap shown in FIG. 2A can be substituted for the second overcap 30 having the protrusion 16.

Referring to FIG. 3, a method of making the stylus pen 10 comprises coupling the ink tip 22 to the first end 20E of the middle portion 20 of the stylus pen 10 and coupling the resistive stylus tip 24 to the second end 20E of said middle portion 20. The plurality of overcaps 30 configured for covering the writing tips are provided, each overcap 30 having the closed end 30 and the open end 30E, the open end configured for accessing the cap interior 30N. The capacitive stylus 26 is coupled to said closed end 30C of the first overcap 30.

The step of coupling the ink tip 22 and the resistive stylus tip 24 to the middle portion 20 is proceeded by forming the exterior housing 18 of the middle portion 20 from antimicrobial material, the housing providing the sanitary surface for grasping when writing.

The step of providing the plurality of overcaps 30 includes the second overcap having the protrusion 16 with the bore 14 configured for attaching said second overcap 30 through said bore, said overcap disposed on the end 10E of the stylus pen.

The LED light 40 and switch 42 are coupled to the closed end of the second overcap, said second overcap disposed on the end 10E of the stylus pen opposite the first overcap.

The antimicrobial sponges 32 are inserted into the overcap interiors 30N, one sponge in each overcap, the antimicrobial sponges contacting the writing tips when said overcap engages said writing tips, said sponge sanitizing said writing tip when not in use.

Referring to FIG. 2, the step of providing the plurality of overcaps includes the third overcap and the LED light 40 is coupled to the closed end 30C of said third overcap, said third overcap disposed on the end of the stylus pen opposite the second overcap, said third overcap disposed over the first overcap.

A method of making the stylus pen 10 as shown in FIG. 1 comprises coupling the ink tip 10 to the first end 20E of the middle portion 20 of the stylus pen and coupling the resistive stylus tip 24 to the second end 20E of said middle portion 20. Further, the method comprises providing the plurality of overcaps 30 configured for covering the ends 20E of the middle portion 20, each overcap having the closed end 30C and the open end 30E, the open end configured for covering the ends 20E of the middle portion and coupling the capacitive stylus 26 to said closed end of the first overcap 30. The method further continues with the step of coating the middle portion 20 and overcaps 30 with the antimicrobial coating providing the sanitary surface for grasping when writing.

The method includes the step of forming the middle portion 20 and the overcaps 30 from the antimicrobial material before coupling the ink tip 22 and the resistive stylus tip 24 to the middle portion 20. The method includes coating the stylus pen with an antimicrobial undercoat and topcoat.

Figure 4:
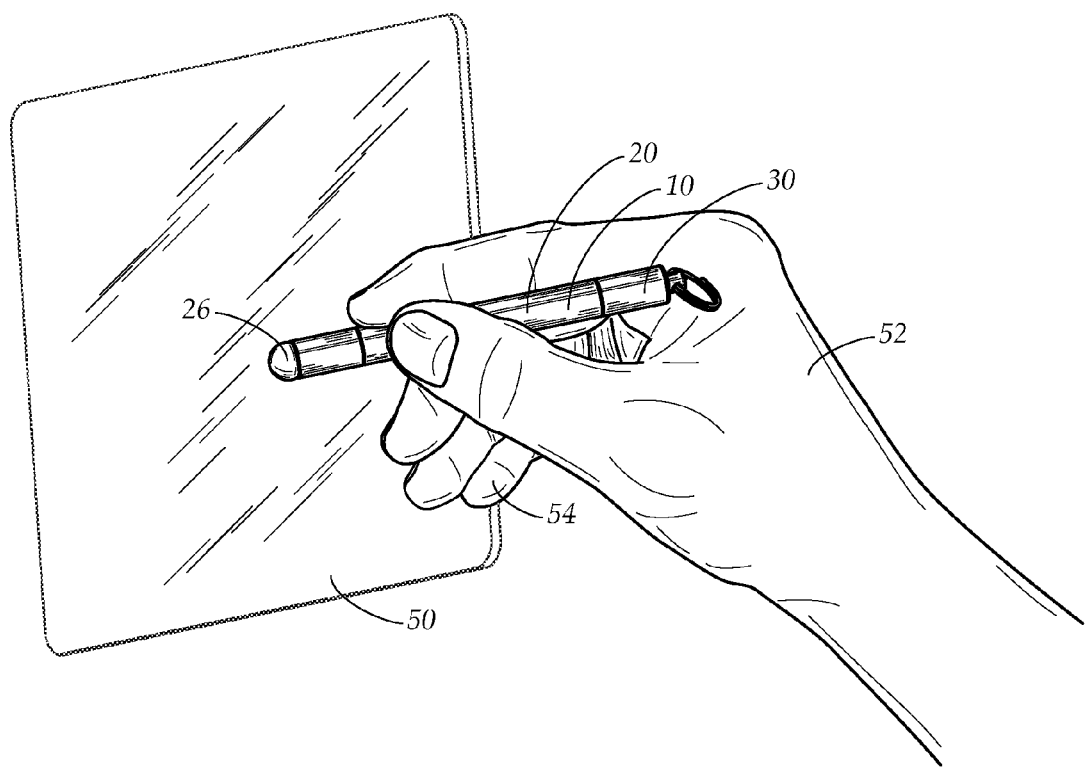
FIG. 4 is a perspective view of the stylus pen in use.

FIG. 4 shows a method of using the stylus pen 10, a user avoiding exposure to harmful germs. The stylus pen 10 is grasped in a hand 52 and held by fingers 54, the fingers touching the antimicrobial middle portion 20. The capacitive stylus tip 26 touches a touch screen 50, substituting for a finger 54, avoiding the germ laden surface of the touch screen. To sign a signature pad or push keys on a keypad, the overcap 30 is removed to expose the resistive stylus tip, avoiding using a public stylus associated with the signature pad or avoiding the keys on the key pad. The second overcap 30 is removed when an ink pen tip is desired.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a stylus pen. The disclosure is illustrated by example in the drawing figures, and throughout the written description. It should be understood that numerous variations are possible, while adhering to the inventive concept. Such variations are contemplated as being a part of the present disclosure.

What is claimed is:

1. A stylus pen for writing on a plurality of dissimilar surfaces, comprising:
   a housing having a middle portion, said middle portion having a pair of ends with a writing tip on each end, a first end having an ink tip operative for writing with ink and a second end having a resistive stylus tip operative for writing on an electronic pad, the middle portion having a supply of ink therein for dispensing through the ink tip, the housing composed of an antibacterial material selected from the group consisting of copper, brass and bronze, the housing providing a sanitary surface for grasping when writing;
   a pair of overcaps, each overcap having a closed end and an open end, the open end operative for covering the ends of the middle portion of the housing, a first overcap having a capacitive stylus tip on said closed end, the capacitive stylus tip operative for writing on a touch screen, a second overcap having a protrusion with a bore operative for attaching said overcap through said bore, each overcap having an antibacterial sponge disposed in each overcap interior, the antibacterial sponges contacting the writing tips on the ends of the middle portion when said overcaps engage said writing tips, said sponge sanitizing said writing tip when not in use; and
   an antibacterial coating on the middle portion and overcaps, the coating providing a sanitary surface when grasping the stylus pen.

2. A stylus pen, for writing on a plurality of dissimilar surfaces, comprising:
   a middle portion having a pair of ends with a writing tip on each end, a first end having ink tip operative for dispensing ink while writing and a second end having a resistive stylus tip operative for writing on an electronic pad, said middle portion formed from an antibacterial material selected from the group consisting of copper, brass and bronze;
   a capacitive stylus tip operative for writing on a touch screen;
   a plurality of overcaps operative for covering the ends of the tips, said overcaps formed from the antibacterial material, each overcap having a closed end and an open end, the open end operative for accessing the cap interior, a first overcap having said capacitive stylus on said closed end, a second overcap having a light-emitting diode (LED) light on the closed end, the LED light emitting sanitizing ultraviolet light when the LED is activated; and
   an antibacterial coating on the middle portion and overcaps, the coating having an antibacterial undercoat containing a phenoxy phenol and an antibacterial topcoat containing zinc and titanium dioxide, the coating providing a sanitary surface when grasping the stylus pen.

* * * * *